United States Patent [19]
Konig et al.

[11] Patent Number: 5,193,276
[45] Date of Patent: Mar. 16, 1993

[54] DEVICE FOR CUTTING OF REINFORCING ELEMENTS FROM A RUBBER OR PLASTIC MATRIX

[75] Inventors: Rudolf Konig, Poing; Jurgen Weisenbach, Munich, both of Fed. Rep. of Germany

[73] Assignee: Stahlgruber, Otto Bruber GmbH & Co., Munich, Fed. Rep. of Germany

[21] Appl. No.: 717,145

[22] Filed: Jun. 18, 1991

[30] Foreign Application Priority Data

Jun. 19, 1990 [DE] Fed. Rep. of Germany ....... 4019511

[51] Int. Cl.⁵ ...................... B21F 23/00; B21F 13/00; H02G 1/12
[52] U.S. Cl. ...................... 30/90.1; 81/9.51; 83/947
[58] Field of Search ...................... 30/90.1, 90.2, 90.3, 30/90.4, 90.51, 92, 286; 81/9.4, 9.51; 83/947

[56] References Cited

U.S. PATENT DOCUMENTS

| | | | |
|---|---|---|---|
| 3,530,575 | 9/1970 | Riche | 30/90.2 |
| 3,575,329 | 4/1971 | Hannaber | 83/947 |
| 3,942,221 | 3/1976 | Sipusic et al. | 30/90.1 |
| 4,120,217 | 10/1978 | Rodd et al. | 81/9.51 |
| 4,143,565 | 3/1979 | Larson | 83/374 |
| 4,179,804 | 12/1979 | Matham | 30/90.1 |
| 4,179,964 | 12/1979 | Kirkgasser et al. | 83/947 |
| 4,230,008 | 10/1980 | Fornwalt et al. | 81/9.51 |
| 4,267,636 | 5/1981 | Ducret | 30/90.3 |
| 4,275,630 | 6/1981 | Goldsmith et al. | 81/9.51 |
| 4,455,745 | 6/1984 | Toeppen | 81/9.51 |
| 4,618,387 | 10/1986 | Fisher et al. | 156/244.1 |
| 4,815,814 | 3/1989 | Ulijasz | 30/91.2 |

FOREIGN PATENT DOCUMENTS

| | | | |
|---|---|---|---|
| 1174385 | 7/1964 | Fed. Rep. of Germany | 30/90.6 |
| 1279934 | 6/1972 | Japan . | |
| 1504702 | 8/1989 | U.S.S.R. | 30/90.1 |
| 1279934 | 6/1972 | United Kingdom . | |

*Primary Examiner*—Douglas D. Watts
*Assistant Examiner*—Paul M. Heyrana, Sr.
*Attorney, Agent, or Firm*—Pennie & Edmonds

[57] ABSTRACT

A device for cutting out reinforcing elements, from a matrix. The device includes a support frame movable in the longitudinal direction of the reinforcing elements and cutting blades for cutting the reinforcing elements away from the matrix as the support frame is moved longitudinally.

12 Claims, 2 Drawing Sheets

DEVICE FOR CUTTING OF REINFORCING ELEMENTS FROM A RUBBER OR PLASTIC MATRIX

BACKGROUND OF THE INVENTION

The need exists in various technical fields to be able to separate high-strength reinforcing elements, such as, for example, metal cables or strands, embedded into a cuttable matrix, such as, for example, rubber or plastic, so as to evaluate individual components separately or perform certain work or procedures on them.

One of these technical areas in which high-strength long-extended reinforcing elements need to be cut out of the matrix for a certain length is that in which the joining of the two ends of a steel cable conveyer belt is required in order to produce, lengthen or shorten the belt. In the joining techniques generally used in the past, all necessary work had to be performed by hand, which required a high outlay in personnel and time, especially for wide conveyer belts. In an initial work procedure, the rubber covering at either end of the belt has to be cut off in a previously determined joining length with the use of special blades impinging closely up to and above the embedded steel cable. In a subsequent work procedure, the rubber between the neighboring steel cables must be cut out with the use of a special blade for rubber, during which process the steel cables still need to be enveloped in some rubber coating, so as not to harm the subsequent vulcanization of the butt plates. The steel cables cut free and still enveloped in rubber are next lightly abraded on all sides with a suitable tool, e.g., a rotating scoring brush, during which process it is once again necessary to take care that the rubber coating is not destroyed. Thereupon the raw dust and other impurities on the abraded steel cable are removed with the aid of brushes or, in some cases, with a suitable cleansing agent. After being coated once or several times with a vulcanizing solution, the steel cables exposed in this manner at either belt end for the length of the connection are put on a prepared lower butt plate by hand and the remaining interstices are filled in with rubber strips. Next, a prepared upper butt plate is placed in the position with respect to the single or multi-stage steel cables located side by side, whereupon vulcanization takes place in a specially heated press. Of the procedures briefly described above, the extraction of the multiplicity of individual wires is the most time and labor-consuming step, one which places the greatest demand on personnel and which involves relatively heavy physical labor.

SUMMARY OF THE PRESENT INVENTION

An object of the present invention is to simplify the cutting out of reinforcing elements from a cuttable rubber or plastic matrix and to create a device with which the manual labor can be considerably reduced or eliminated.

This task is solved in accordance with the present invention with the positioning of a lower blade and an upper blade in a support frame so that it can be moved by a special drive to cause cutting to be executed above and below one reinforcing element for each motion traveled. During the process, by virtue of the special shape given the cutting edge, both partial cuts are complemented to form a complete cut and thus one element of reinforcing is excised from the rubber or plastic matrix by each pairing of blades. Since for each of these cutting operations the upper and lower layer of coating are also cut from the matrix by means of special cutting edges on the lower and upper blade, the reinforcing element will be cut free in one cutting operation.

In accordance with a further embodiment of the present invention, the lower and upper blade each have an arc-shaped guide section connected to the preferably arc-shaped cutting edge, a guide section which causes the blade to center itself on the longitudinal axis of the reinforcing element during the cutting process and guarantees that the line of cutting of the arc-shaped cutting edge runs at a discretionary interval spaced from the surface of the reinforcing element and thus the excised reinforcing element is encased with a rubbing coating or casing of constant thickness. The cutting guide section and thus the wall thickness of this casing layer can be set for an optimal amount by adjusting the position of the lower and upper blades. In addition, the blades and cooperating counter braces preferably formed as pressure rollers are each individually arranged so as to be adjustable, in order for the device to adapt in a simple manner to various forms and thicknesses of the rubber or plastic matrix, especially the thickness of a conveyer belt.

The support frame preferably consists of two sections that can be moved relative to one another and that border on a lateral uptake aperture for the rubber or plastic matrix. The two sections are spread apart for purposes of introducing the matrix prior to a cutting operation and, once the matrix has been introduced, are closed together into the operating position, possibly with the use of a screw spindle. During this process, one set screw will determine the interval between the two sections of the frame as best suited to each respective cutting operation.

The device in accordance with the present invention has the advantage of reducing the previously laborious and strenuous physical work involved in cutting out long-extended high-strength reinforcing elements from their rubber or plastic matrix to a minimum. This applies especially to producing a joint between two conveyer belt ends with sheathed steel cables. The steel cables can be cut out using the device in accordance with the present invention practically without any manual work. The result is that several of the steps that were previously necessary, such as stripping the upper and lower sections of the belt, abrading and cleaning the remaining casing on the steel cable, and, finally, cutting with hand knives, are eliminated. The expenditure in time and labor necessary for joining a wide steel cable belt band can be shortened to a fraction of the time previously required, which will have an extraordinary effect on economy. In addition, the remaining work can also be performed by relatively untrained personnel.

BRIEF DESCRIPTION OF THE DRAWINGS

FIG. 3 is a perspective view of a blade in a three-dimensional representation as incorporated into the device of the present invention.

DESCRIPTION OF THE PREFERRED EMBODIMENT

Figure 1:
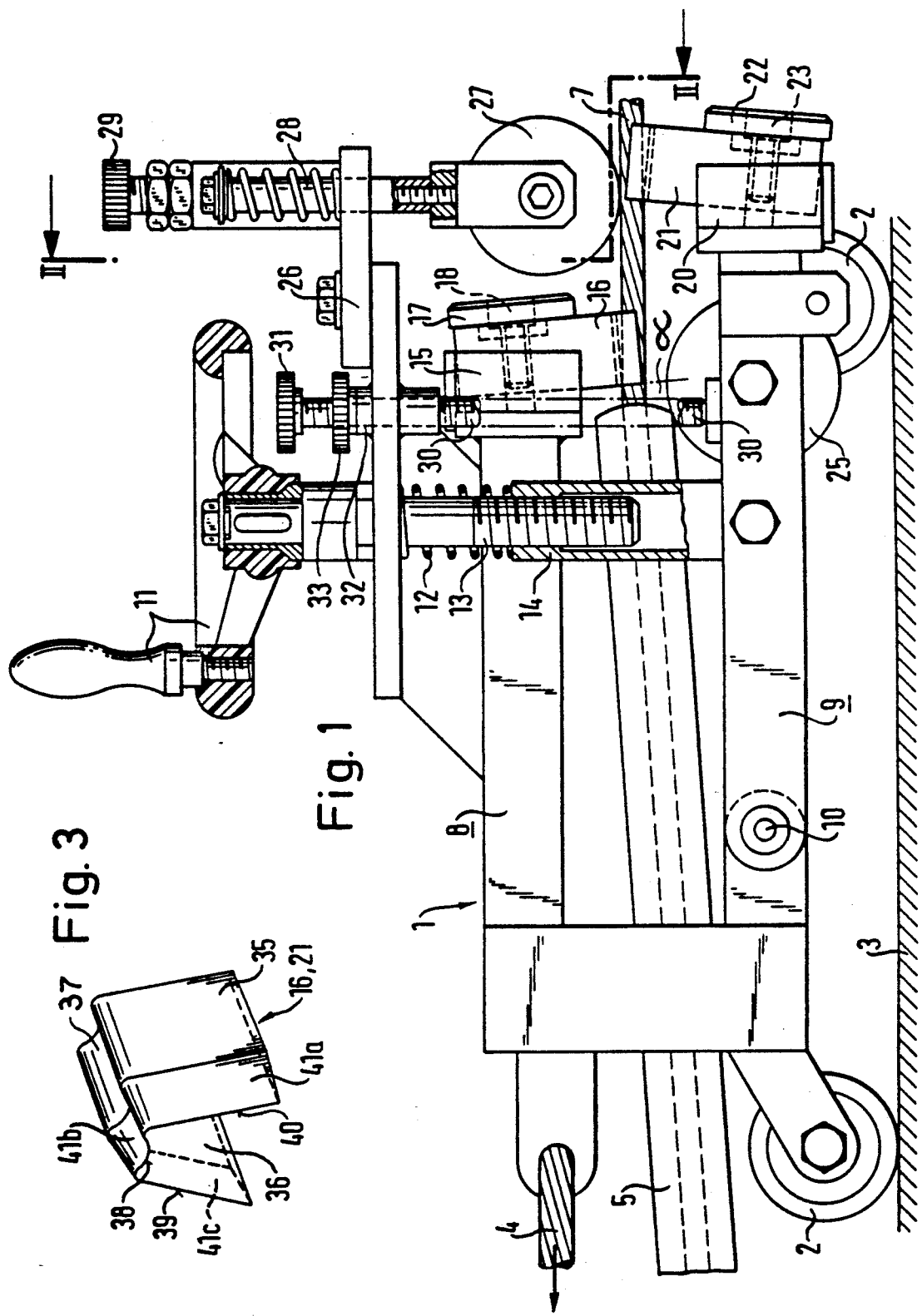
FIG. 1 is a side elevation of the cutting device constructed according to the present invention.

The cutting device for cutting the steel cable out of a conveyer belt contains a frame 1, which rides on a level base 3 with the use of four rollers 2. A traction cable 4 is attached at the front end of the frame 1 and is coupled with a drive, not shown, with which cable the cutting device is pulled in a longitudinal direction of a matrix in the form of a belt band 5. During this movement, the belt band 5 is taken up in a lateral opening 6 of the frame. Steel cables 7 are embedded in the central core region of the belt band 5 and with the aid of a cutting device are cut out in the manner explained below.

The frame 1 consists of two main components 8 and 9, which are connected to one another by a coupling element 10, so that the front pair of rollers 2 is mounted in frame section 8 and the back pair of rollers is mounted in frame section 9. Both frame sections 8, 9 can be adjusted toward one another by means of a screw spindle 13 that can be operated by a crank handle 11 against the effect of a spring 12. The thread sleeve 14 of the screw spindle is fastened onto the lower frame section 9 that can be pivoted. In order to introduce the belt band 5 into the uptake aperture 6, the screw spindle 13 is unscrewed from the thread sleeve 14, by means of which the aperture 6 will be accordingly enlarged.

Figure 2:
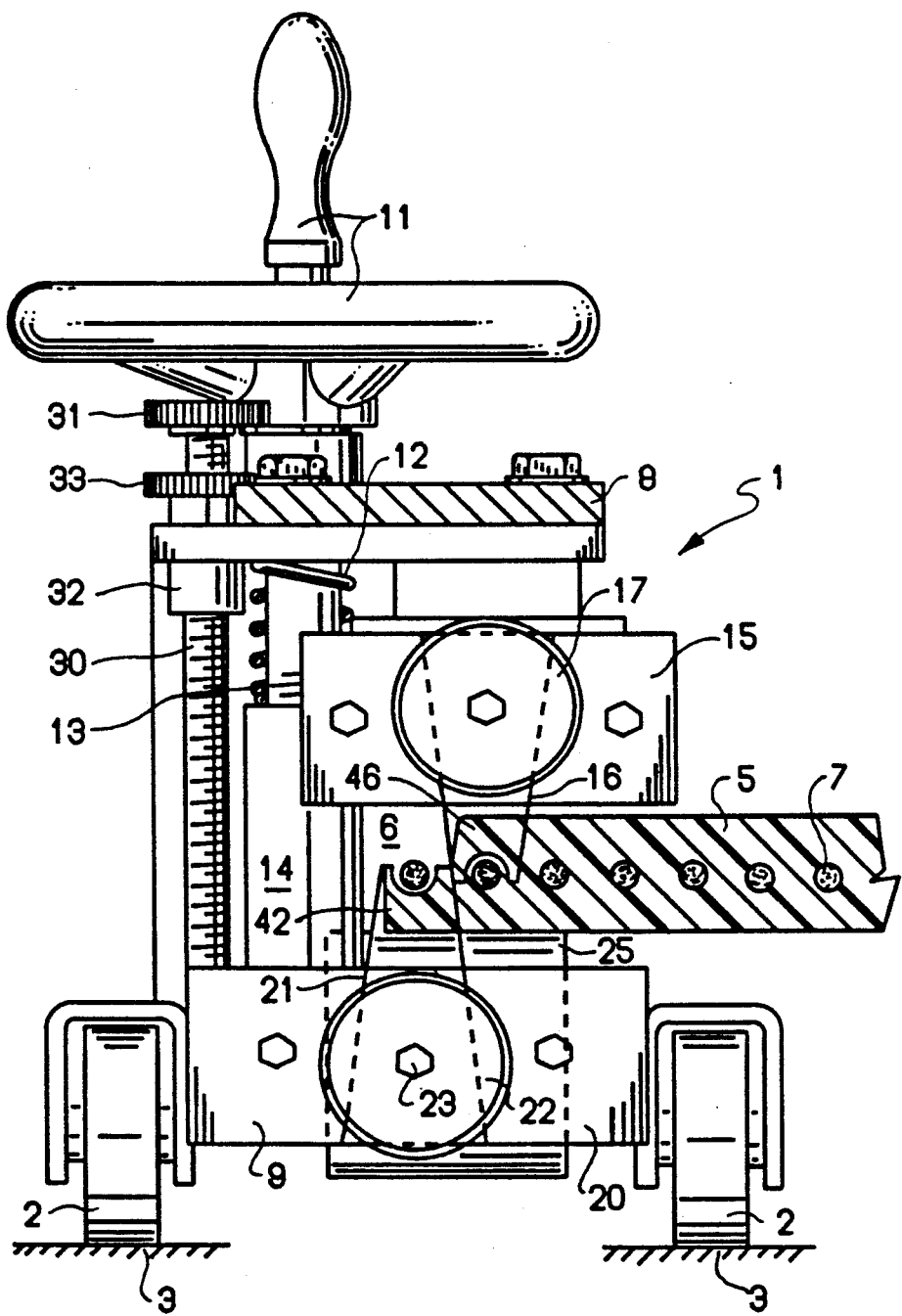
FIG. 2 is a cross-sectional view taken along lines II—II of FIG. 1.

At the upper frame section an adjustable holder is mounted. An upper blade 16 is attached in this holder with the aid of a clamping plate 17 and a screw 18, so as to be detachable. In the lower frame section 9 an adjustable holder 20 is provided for a lower blade 21, which, in a manner similar to the upper blade 16, is firmly but detachably clamped into the holder with the aid of a clamping plate 22 and a screw 23. Below the upper blade 16 a counter brace is mounted. This brace takes the form of a pressure roller 25 in the lower frame section 9. The contact surface of this counter brace presses against the lower side of the belt band 5 (FIG. 2). In an analogous manner, a counter brace in the form of a pressure roller 27 is provided above the lower blade 21. This roller 27 is mounted on a plate 26 attached at the upper frame section 8 and which can be adjusted in its set elevation by means of set screws 28, 29 and locked in place (FIG. 1).

The distance between the two frame sections 8 and 9 and thus the position of the upper blade 16 secured on the upper frame section 8 with respect to the counter brace 25 mounted in the lower frame section 9 is determined by means of a set screw 30. This screw rests at its lower end in the frame section 9 and can be adjusted by means of a milled head 31 in a matching guide 32 in the upper frame section 8. A milled nut 33 is provided for securing it in place.

As seen in FIG. 2, the two identically shaped blades 16, 21 consist of a sheet metal blank made of, for example, spring steel, and formed by bending. Two essentially straight side blades 35, 36 are connected by a partially cylindrical indented guiding and centering section 37, which serves as a self-centering guide for each respective steel cable 7 during the cutting process. A cutting edge 38 is formed in the guiding and centering section 37 at the front side of the blade. The cutting edge continues into one cutting section each 39, 40 on either of the two side blades 35, 36. These cutting edges 38 to 40 are bordered by the inner surface of the sheet metal blank and an outer diagonal surface 41a, 41b, 41c. As may be seen especially in FIG. 1, both blades 16, 21 are oriented at an acute angle toward the longitudinal axis of each steel cable 7. This acute angle $a$ is identical with the inclination of the diagonal surface 41a, 41b, 41c toward each of the side blades 35, 36 and the guiding and centering section 37 of the metal blank and only a few degrees in magnitude. The surface 41b is maintained at a slight distance from the cable 7 so as to space the cutting edges 38, 39 and 40 from the cable. In this manner an optimal cutting effect is achieved, as well as self-centering of the blade with respect to the steel cable, with the result that the steel cable cut out will possess a rubber casing of constant wall thickness and strength. Simultaneously, in each cutting operation of the upper blade 16 and the lower blade 21 a constantly stem-shaped strip will be cut out of each of the upper and lower layers of the belt, so that after the completion of all cutting operations the belt will appear in the form of a multiplicity of strips and with the reinforcing cables 7 cut out.

The device described in detail above works in the following manner. Given a conveyer belt situated on a base 3, the steel cable is exposed for a few centimeters by hand, using a conventional knife, and at a predetermined interval which is equal to the joining length of each respective belt end. Thereupon, the device is applied laterally at one edge of the belt so that the one belt edge catches in the lateral aperture 6. In order to make this maneuver possible, the upper frame section 8 is lifted up by turning the hand crank 11 with respect to the lower frame section 9 superimposed on the base 3 with the use of rollers 2. By turning the hand crank once more, the upper frame section is lowered into the position with respect to the lower frame section, as shown in FIG. 1, during which process the lower pressure roller 25 comes up to the lower surface of the belt and the upper pressure roller 27 to the upper surface of a steel cable 7 to apply pressure, and precisely in the manner depicted in FIGS. 1 and 2, i.e., below and above the assigned blades 16 and 21,. The proper interval of the pressure roller 25 functioning as a lower counter brace is set by working the set screw 30, which, when the upper frame 8 is closed by means of the crank 11, comes to rest on one of the plates attached to the lower frame 9. The pressure roller 27, functioning as a counter brace, is set separately by working the set screws 28, 29.

The device is next pulled on the base (by using the drive, not shown, and the traction element 4) in the longitudinal direction of the belt. During this process the upper blade 16 and simultaneously the lower blade 21 each perform a cut. By virtue of the lateral staggering of these two blades 16, 21, the lower blade 21 will respectively cut the externally situated steel cable 7 and the upper blade the neighboring steel cable 7 out of the conveyer belt, in the manner shown in FIG. 2, during which process one strip 42 and 46 for each will result. After such a cutting procedure has been executed up to each respective end of the belt, the device is returned to its original position; and once the steel cable 7 has been removed, is addressed to the newly formed edge of the belt, whereupon cutting procedure is continued by a renewed longitudinal movement of the device.

The device shown in the drawings is a compact and lightweight hand apparatus that can be operated by one attendant. It is only necessary in exceptional cases to guide the apparatus through the cutting procedure by hand, because owing to the shape of the upper and lower blades, they guide themselves. Thus the apparatus rolls along the table-shaped base and along the steel cables 7 arranged parallel to one another in the belt. By using such a hand apparatus a number of the work steps necessary under the current state of the art can be eliminated. This will bring about considerable savings in man-hours in making high-strength joints between two belt ends.

With the present invention, it is also possible to cut out other long-extended reinforcing elements made of metal cable, metal rods or the like out of a rubber or plastic matrix, which, for example, may become necessary for the preparation or disposal of such composite materials. Used or completely worn out conveyer belts reinforced with steel cable especially, as used, for example, in open-pit mining, can be prepared for purposes of disposal by removing the steel reinforcing elements from the rubber matrix. In such a case it is useful for the cutting device to possess a number of upper and lower blades arranged side by side, so as to be able to cut out a correspondingly large number of steel cables in one single cutting operation. Under certain circumstances even only one set of blades would suffice for such an apparatus, because the reinforcing cables could each be removed or pulled out of their respective beds diagonally upward, following a complete removal of the upper rubber layer. And finally, the bead core of worn-out vehicle tires could be cut out in accordance with the principle of the present invention with a contoured upper and lower blade, for which purpose in such a case the cutting device would be arranged in a stationary position above a rotary driven holding device for a tire.

We claim:

1. A device for longitudinal cutting out long-longitudinally extended reinforcing elements, such as steel cables, from a rubber or plastic matrix, such as a conveyor belt, said device comprising:
    a) a support frame (1) movable in the longitudinal direction of the reinforcing elements (7);
    b) a lower blade (21) mounted in the support frame (1) below the matrix with a contoured cutting edge (38) surrounding a lower circumferential portion of reinforcing element (7) at a discretionary intervening spacing therefrom and having said cutting edge facing in said longitudinal direction;
    c) an upper blade (16) mounted in the support frame (1) above the matrix with a contoured cutting edge (38) surrounding an upper circumferential portion of an reinforcing element (7) at a discretionary intervening spacing therefrom and having said cutting edge facing in said longitudinal direction; and
    d) counter brace means (25, 27) mounted in the support frame (1) below and above the matrix and in opposed relation to the upper blade (16) and the lower blade (21), respectively.

2. The device according to claim 1, wherein the lower blade (21) and the upper blade (16) each have a guiding and centering section (37) bordering on an arc-shaped cutting edge (38).

3. The device according to claim 1, wherein the position of the lower blade (21) and the upper blade (16) relative to the reinforcing elements is adjustable.

4. The device according to claim 1, wherein the counter brace means (25, 27) include pressure rollers and means are included for adjusting the spacing between the rollers and the respective blades (16, 21).

5. The device according to claim 1, wherein each of the blades (16, 21) is a bent spring steel blank with two side blades (35, 36) extending from opposite sides of a guiding and centering section (37) and each having a cutting edge section (39, 40) extending from the arc-shaped cutting edge (38), said edges being inwardly tilted.

6. The device according to claim 5, wherein:
    a) the blades each have an exterior diagonal surface (41a, 41b, 41c);
    b) holders (15, 20) are mounted on the support frame (1) for adjustably holding the blades (16, 21); and
    c) the blades (16, 21) are locked into the holders (15, 20) in an orientation relative to the reinforcing elements (7) whereby the exterior diagonal surface (41b) of the cutting edge (38) runs concentric to the reinforcing element (7).

7. The device according to claim 1, wherein:
    a) the support frame (1) consists of two spaced sections (8, 9), adjustably connected to the support frame (1) for movement toward one another for the purpose of introducing the matrix (5) into a lateral uptake aperture (6) defined by the spacing between the two sections; and
    b) means are provided on the support frame (1) for locking the two sections (8, 9) in place with respect to one another after the matrix has been fed in.

8. The device according to claim 7, wherein the lower blade (21) and the counter brace (25) for the upper blade are mounted in the lower frame section (9) and the upper blade (16), together with the counter brace (27) for the lower blade (21) are mounted in the upper frame section (8).

9. The device according to claim 7, wherein both frame sections (8, 9) are pivotally mounted on the support frame (1) for movement toward each other against the force of a spring (12), by means of a hand crank and a set screw (13) connected between the frame sections (8,9).

10. The device according to claim 1, wherein:
    a) a traction cable (4) is connected to the support frame for attachment to a drive for moving the device longitudinally along said reinforcing element (7).

11. The device according to claim 1, wherein the lower blade (21) is positioned with its respective counter brace (27) so as to be staggered with respect to the upper blade (16) and its respective counter brace (25) in the longitudinal and lateral direction relative to the matrix.

12. The device according to claim 1, wherein a number of upper and lower blades are arranged in the support frame (1) at a lateral interval to one another which is equal to the distribution of the reinforcing elements (7) in the matrix.

* * * * *